US005172346A

United States Patent [19]

Wagner et al.

[11] Patent Number: 5,172,346

[45] Date of Patent: Dec. 15, 1992

[54] METHOD AND APPARATUS FOR THE REMOTE CONTROL OF A HEARING AID MEANS

[75] Inventors: Juergen Wagner, Kueps; Dieter Busch, Effeltrich, both of Fed. Rep. of Germany

[73] Assignee: Siemens Aktiengesellschaft, Munich, Fed. Rep. of Germany

[21] Appl. No.: 736,945

[22] Filed: Jul. 29, 1991

[30] Foreign Application Priority Data

Aug. 2, 1990 [EP] European Pat. Off. ........ 90114881.7

[51] Int. Cl.[5] ........................ H04B 5/00; H04R 25/00

[52] U.S. Cl. ........................................ 367/197; 381/68

[58] Field of Search .............................. 367/197, 199; 340/825.19, 825.69, 825.72; 381/68, 68.1, 68.2, 68.3, 68.4, 68.5, 68.6, 68.7

[56] References Cited

U.S. PATENT DOCUMENTS

| | | | |
|---|---|---|---|
| 3,855,575 | 12/1974 | Leuschner et al. | 367/199 |
| 4,189,713 | 2/1980 | Duffy | 340/168 R |
| 4,845,755 | 7/1989 | Busch et al. | 381/68 |
| 4,918,736 | 4/1990 | Bordowijk | 381/68 |
| 4,975,654 | 12/1990 | Becker et al. | 381/68 |

FOREIGN PATENT DOCUMENTS

3527112A1 1/1987 Fed. Rep. of Germany .

OTHER PUBLICATIONS

Funkschau, 1975, "Ultraschall-Fernbedienung mit Pulscodeuebertragung", Dipl.-Ing. Juergen Wermescher, pp. 69-72.

Patent Abstracts of Japan, vol. 8, No. 206 (E-267), Sep. 20, 1984, "Ultrasonic Wave Wireless Remote Controller", Toshiichi Hayashi.

*Primary Examiner*—Donald J. Yusko
*Assistant Examiner*—Dervis Magistre

[57] ABSTRACT

According to a remote control method, sound waves are output by a transmitter as short and long remote control pulses. These pulses are evaluated according to their duration. In order to largely avoid disturbances in the evaluation due to superimposition with reflected remote control signals, defined parameters, particularly at least one evaluation time of the remote control method, are adapted to variations in the duration of the remote control pulses output by the transmitter which are possible due to superimposition. Furthermore, a blanking is proposed which has a variable blanking duration that automatically adapts to a pause duration between two remote control pulses, which is varied due to a reflection.

23 Claims, 3 Drawing Sheets

METHOD AND APPARATUS FOR THE REMOTE CONTROL OF A HEARING AID MEANS

BACKGROUND OF THE INVENTION

The present invention is directed to a method for the remote control of a hearing aid means on the basis of pulses having different pulse duration formed by sound waves, whereby the pulses are evaluated according to their duration. The invention is also directed to a remote control means for the implementation of the method.

In remote control methods and remote control means of the type initially cited, sound waves are output by a transmitter, these sound waves being converted, for example by modulation with a square-wave signal (envelope), into remote control pulses having short and long duration. These sound waves are received and evaluated by a separate remote control receiver, for example in a hearing aid, for controlling or, respectively, for setting functions, for example volume in the hearing aid. Due to reflection of sound waves (remote control pulses) at articles in the environment of such a remote control means, chronologically delayed remote control pulses proceed to the receiver due to the longer distance. These reflected pulses can superimpose with the directly received remote control pulses. As a result thereof, the chronological duration of the respective remote control pulse can be lengthened by the delay time of the remote control pulses received as a reflection. In addition, it is also possible that, particularly for a short remote control pulse, a reflected remote control pulse arises which, given an adequately long running time, arrives at the receiver as a remote control pulse chronologically separated by a pause from the directly received remote control pulse. The described reflections of sound waves particularly lead to a lengthening of the duration of the original remote control pulses. The evaluation of the remote control pulses is consequently deteriorated.

SUMMARY OF THE INVENTION

An object of the invention is to specify a method and a remote control means of the type initially cited wherein the deterioration of the evaluation due to reflections is diminished.

According to the invention, a method and apparatus is provided for remote control of a hearing aid circuit wherein control pulses are provided formed by sound waves which have long and short pulse durations. The pulses are evaluated in accordance with their pulse duration such that a respective evaluation time is allocated to the pulse starts. A chronological spacing is provided of the evaluation times from a respective corresponding pulse start shorter than the long pulse duration and longer than a sum of the short pulse duration and a time by which the short pulse duration can be lengthened by a received reflection of the sound waves.

Also with the method and apparatus for remote control of a hearing aid circuit according to the invention, control pulses are provided formed by sound waves which are not reflected and which have long and short pulse durations, and wherein reflections of the sound waves can also be present whose pulses are mixed in with the pulses of the unreflected sound waves. The pulses are evaluated according to their durations. Pulses of the reflected sound waves appearing after an end of a short pulse duration control pulse are blanked with blanking pulses that have a blanking time of variable duration. The blanking time is automatically adapted to a duration of a pause which remains between an end of a control pulse which is lengthened by reflection and a start of a following control pulse.

A critical advantage of the invention is that the deterioration of the evaluation of remote control pulses formed of sound waves having long and short durations due to reflection is noticeably diminished. This particularly occurs on the basis of an adaptation of at least one evaluation time to the remote control pulses which can be lengthened by reflections. Furthermore, the deterioration of the evaluation of remote control pulses can be diminished since a blanking is provided which automatically adapts to the remote control pulses lengthened by reflections. It is especially advantageous when both an adaptation of the evaluation time as well as an adaptation of the blanking to remote control pulses lengthened by reflections are simultaneously undertaken in a remote control means. Nearly all deteriorations (misinterpretations) occurring due to reflections can be avoided in such a remote control means.

DESCRIPTION OF THE PREFERRED EMBODIMENT

Figure 1:
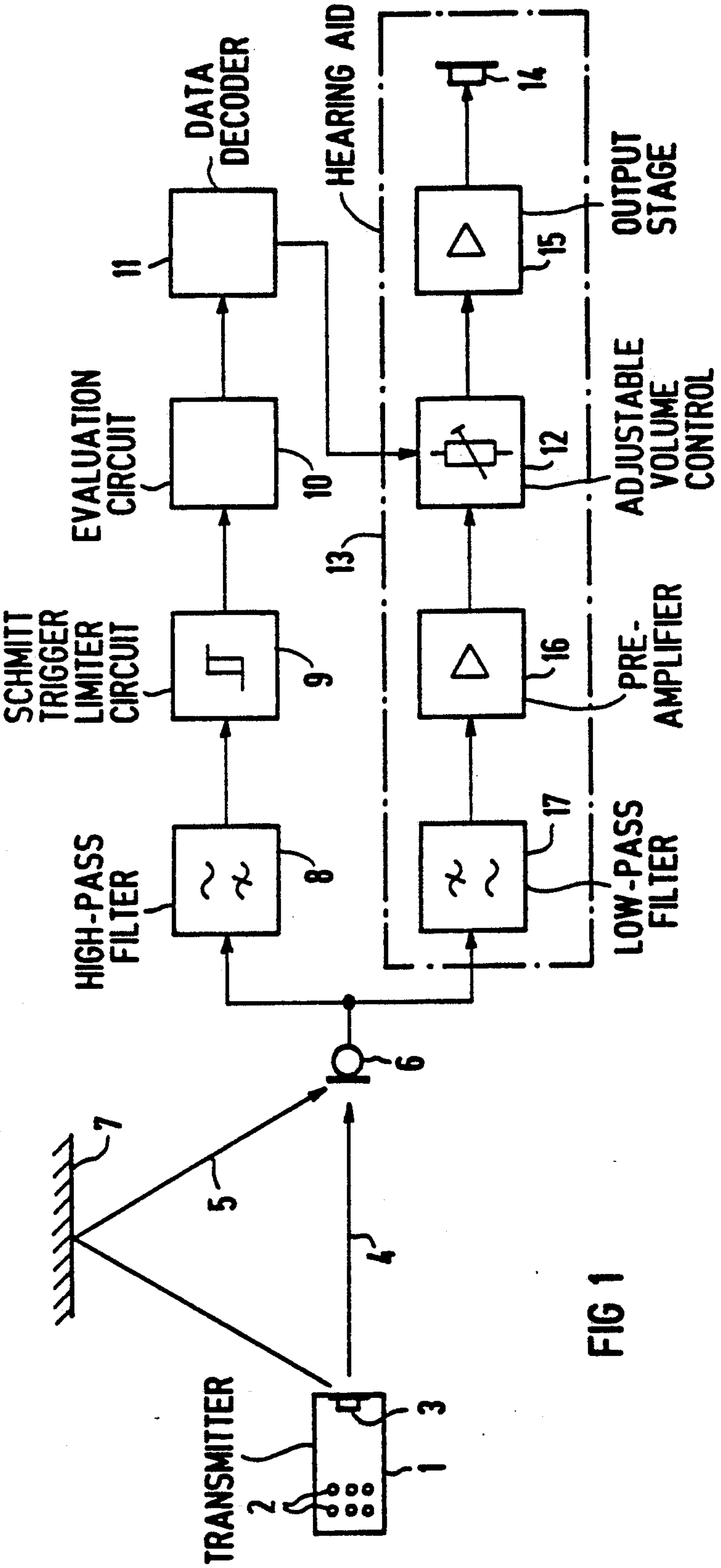
FIG. 1 is a fundamental block circuit diagram of a remote control means of the invention in combination with a hearing aid.

In FIG. 1, a transmitter 1 that comprises a key control 2 outputs sound waves via an output sound transducer 3, for example ultrasound waves having a frequency of approximately 25 KHz. These sound waves are remote control pulses having short and long duration which propagate via different paths, as symbolized by arrows 4 and 5. Whereas the sound waves of arrow 5 proceed to a microphone 6 on a short path, the sound waves on the path symbolized by the arrow 5 are reflected at an article 7 and can thus proceed to the microphone 6 over a longer path, i.e. delayed. The remote control pulses converted into electrical signals in the microphone 6 proceed via a high-pass filter 8 and via a limiter circuit which, for example, is designed as a Schmitt trigger 9 to an evaluation circuit 10. The evaluated remote control pulses are supplied via a data decoder 11 to one or more remote-controllable component parts, for example an electronically adjustable volume control 12, for controlling one or more functions in a hearing aid 13. The hearing aid 13 comprises an earphone (output sound transducer) 14, an output stage 15, the electronically adjustable volume control 12, a pre-amplifier 16, and a low-pass filter 17 which is connected to the microphone 6. Consequently, the microphone 6 serves the purpose both of accepting remote control sound signals (remote control pulses) as well as the purpose of accepting voice and ambient noise for the actual hearing aid 13.

Figure 2:
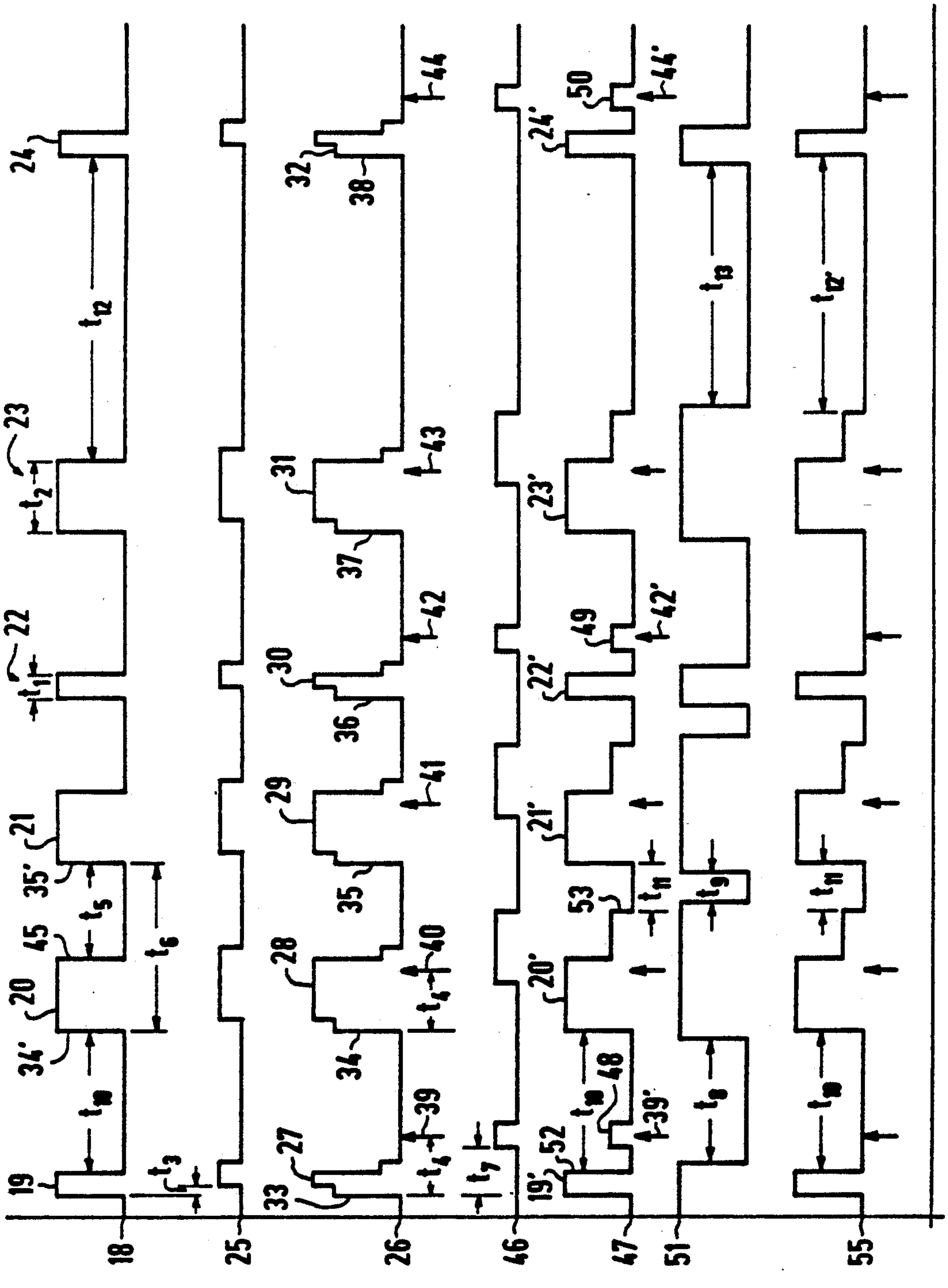
FIG. 2 is a diagram with remote control pulses which can occur in the methods and devices of the invention.

FIG. 2 shows the remote control pulses output by the transmitter 1 as a pulse sequence 18 comprising remote control pulses 19 through 24 having short durations $t_1$ and long durations $t_2$ that have proceeded to the microphone 6 on a direct path. A reflected pulse sequence 25 which is identical to the pulse sequence 18 with respect to pulse duration and pulse spacings, likewise proceeds to the microphone 6 with lower amplitude on an indirect path offset by a difference $t_3$ in running time. The pulse sequence 26 having remote control pulses 27 through 32 which are modified in comparison to the original remote control pulses 19 through 24, arises due to an additive overlaying of the two pulse sequences 18 and 25, these modified remote control pulses 27 through 32 being particularly lengthened in duration by the difference $t_3$ in running time. As symbolically represented with reference to the received pulse sequence 26, at least one evaluation time 39 through 44 (each symbolized by a respective arrow) and dependent on every start 33 through 38 of the respectively received remote control pulses 27 through 32 is prescribed, the chronological distance $t_4$ thereof from every start 33 through 38 of the respective remote control pulses 27 through 32 being selected shorter than the long durations $t_2$ of a remote control pulse 20, 21, or 23, and longer than the sum of the short duration $t_1$ of a remote control pulse 19, 22, or 24 and the duration $t_3$ by which this short duration $t_1$ can be lengthened by a received reflection 25 of the sound waves. As a result thereof, a noticeably disturbance-freer discrimination between long and short remote control pulses is achieved.

It is especially advantageous when the chronological spacing $t_4$ of the respective evaluation time 39 through 44 from the respective start 33 through 38 at the remote control pulses 27 through 32 is selected at least twice as long as the short duration $t_1$ of a chronologically short pulse 19, 22, or 24. Moreover, it is advantageous when a chronological spacing $t_5$ which is selected longer than the duration $t_2$ of a chronologically long remote control pulse, for example remote control pulse 20, 21, and 23, is provided between an end 45 of the remote control pulse of long duration (see pulse sequence 18), for example remote control pulse 20, and a start 35' of a following remote control pulse, for example remote control pulse 21.

In order to also be able to reliably evaluate the remote control pulses 20, 21, and 23 having a long duration $t_2$ given an extremely great difference $t_3$ in running time due to reflections, a chronological spacing $t_6$ which is selected at least twice as long as the duration $t_2$ of a chronologically long remote control pulse, for example remote control pulse 23, is provided between the starts 34' and 35' of two remote control pulses, for example 20 and 21. In the pulse sequence 18, the duration $t_2$ of a chronologically long remote control pulse, for example remote control pulse 23, is selected at least twice as long as the duration $t_1$ of a chronologically short remote control pulse, for example remote control pulse 22. As a result thereof, an even better discrimination between long and short remote control pulses given occurring reflections is achieved.

FIG. 2 also shows a reflected pulse sequence 46 which, compared to the directly received pulse sequence 18, has a great difference $t_7$ in running time that is greater than the difference $t_3$ in running time. Given overlaying with the pulse sequence 18, this leads to an evaluatable pulse sequence 47. The pulse sequence 47 contains reflected pulses 48 through 50 which are offset (separated) from the remote control pulses 19', 22' and 24'. In order to prevent these reflected pulses 48 through 50 from being interpreted as remote control pulses having a long duration due to the allocated evaluation time 39', 42' or, respectively 44', a special blanking is provided whose blanking signal is represented as a blanking pulse sequence 51 in FIG. 2.

According to the method of the invention, this blanking pulse sequence 51 has a variable duration $t_8$ or $t_9$ of the blanking time. The variable duration $t_8$ or $t_9$ of the blanking time begins after every end 52 or 53 of an end 52 of the pulse 19' lengthenable by reflection, or after an end 53 of a remote control pulse 20' lengthenable by reflection (see the pulse sequence 47). The variable duration $t_8$ of the blanking time is automatically adapted to the duration $t_{10}$ of a pause which remains between the end of the remote control pulse 19' lengthenable by reflection and the start of the following remote control pulse 20'. Further, the variable duration $t_9$ of the blanking is automatically adapted to the duration $t_{11}$ of a pause which remains between the end 53 of the remote control pulse 20' lengthened by reflection and the start of a following remote control pulse 21'. The corresponding procedure automatically occurs with reference to the remaining remote control pulses. An evaluatable pulse sequence 55 that contains no separate, reflected pulses arises as a result.

Figure 3:
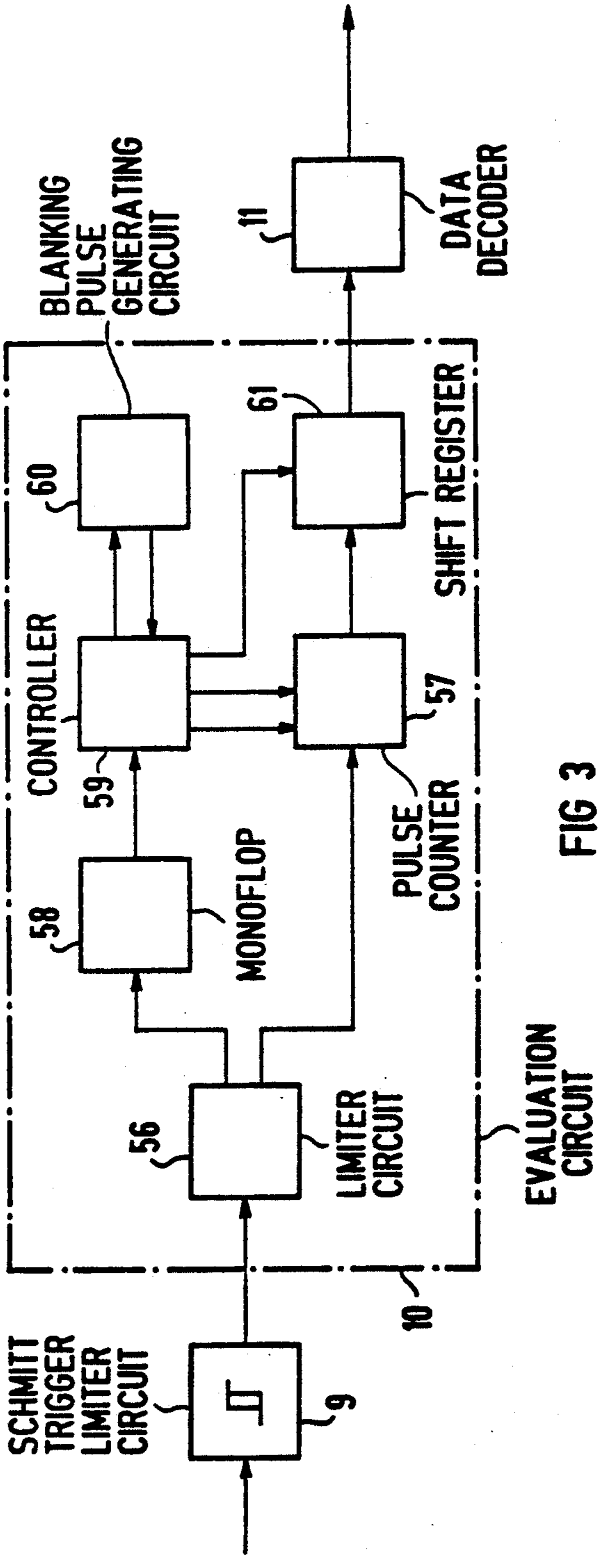
FIG. 3 is a detailed block circuit diagram of the evaluation circuit contained in FIG. 1.

The evaluation circuit 10 contained in FIG. 1 is shown in greater detail in FIG. 3. The limiter circuit, the Schmitt trigger 9, also shown in FIG. 1, prevents especially weak remote control pulses, and particularly weak reflected remote control pulses, from proceeding to the evaluation circuit 10. As a result thereof, the reliability vis-a-vis disturbances of the evaluation due to reflections is additionally improved. The remote control pulses are formed of a defined plurality of sound oscillations, for example ultrasound oscillations. A remote control pulse having long durations $t_2$, thereby contains, corresponding to its duration $t_2$ (envelope), a greater number of ultrasound oscillations (carrier frequency oscillations) than a remote control pulse having short durations $t_1$. In order to limit the sound oscillations, and thus the remote control pulses as well, in amplitude, these are supplied to a pulse shaping circuit (a further limiter circuit 56). As a result thereof, countable square-wave pulses having a repetition rate of, for example, 25 kHz arise. The number of these 25 kHz pulses is predetermined by the long duration $t_2$ or by the short duration $t_1$ of the remote control pulses. Accordingly, every chronological duration $t_1$, $t_2$ corresponds to a defined plurality of countable pulses. The 25 kHz pulses are simultaneously supplied to a pulse counter 57 and to a monoflop 58. The monoflop 58 has a hold time on the order of magnitude of the duration of an oscillatory period of the sound waves used for the remote control. As a result thereof, the monoflop is always set only approximately as long as or respectively slightly longer than, the presence of a pulse from the carrier frequency signal, for example a 25 kHz pulse. Consequently, the start and end of the remote control pulse (envelope) can be unambiguously portrayed at the output of the monoflop 58. As a result, a demodulation and filter circuit for generating an envelope which represents the remote control pulses, for example pulse sequence 26, is eliminated. The output signal or the monoflop 58 that consequently at least approximately corresponds to the remote control pulses, for example 19 through 24, and signals the start and end of a remote control pulse, is supplied to a controller 59.

The carrier-frequency pulses are counted in the pulse counter 57. The pulse counter 57 is controlled by the controller 59, for example resetting to 0 and/or abort of the counting procedure given a pulse count that goes beyond a prescribed framework. Thus, it is possible to abort the counting process when, for example, a minimum plurality of counting pulses is not reached, this covering a remote control pulse 19, 20, or 24 of short duration $t_1$. Further, the counting procedure can be aborted when a plurality of counting pulses was counted which is greater than the plurality that corresponds, for example, to the duration $t_2$ of a long pulse that is lengthened by a reflection. Two additional evaluation times can be created in a simple way with these techniques in order to suppress noise signals. In the remote control method of the invention, consequently the chronological spacing $t_4$ of the evaluation time 39 through 44 which is provided for discriminating between remote control pulses of short and long duration can likewise have a defined plurality of carrier frequency pulses allocated to it, this plurality having to be at least reached in order to recognize a remote control pulse having a long duration $t_2$. As a result of employing higher-frequency sound waves, particularly ultrasound waves, the transmission rate of remote control pulses can become relatively high, since the plurality of evaluatable carrier frequency pulses per time unit increases with increasing frequency.

The controller 59 is in communication with a circuit 60 for generating the blanking pulses 51 having variable durations $t_8$, $t_9$ and potentially having a blanking time $t_{13}$. Since the start and end of each and every remote control pulse, for example even the end of a remote control pulse lengthened by reflection, is signalled to the controller 59 by the monoflop 58, the variable blanking of the invention can be realized with little structural expense, for example with monoflops having different hold times. One hold time is the duration $t_6$ between two remote control pulses and the other hold time is additionally adapted to a duration $t_{12}$ of a pause between remote control pulses (data words) combined into groups. The monoflops (not shown) serving the purpose of blanking are started by every start of a remote control pulse signalled by the monoflop 58. An enable (forwarding) by the controller 59 as blanking signal 51, however, only occurs when the monoflop 58 has signalled a pulse end, for example 52 or 53, of a remote control pulse or of a group of remote control pulses which can be lengthened by reflections. A long blanking time $t_{13}$ can thereby be realized, as a result whereof disturbances between two groups (data words) of remote control pulses can also be suppressed. One monoflop suffices for generating the blanking times $t_8$ and $t_9$, since the chronological spacing $t_6$ between remote control pulses of one group is always of the same length.

As may be seen from the pulse sequence 18 in FIG. 2, the pulses 19 through 23 are combined to form a group having respectively identical pulse spacings $t_6$ from one another, a further group beginning with the remote control pulse 24 following thereupon after the longer pause duration $t_{12}$. The controller 59 in FIG. 3 not only makes it possible to recognize remote control pulses having short and long durations, but also makes it possible to recognize data words having a defined plurality of remote control pulses which are separated by the longer pulse spacings $t_{12}$. A shift register 61 is correspondingly controlled by the controller 59. As soon as a given plurality of remote control pulses 19 through 23 for a data word has been reached, this is supplied to the data decoder 11 which in turn then sets the desired function in the hearing aid, for example setting the volume via the electronically adjustable volume control 12.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for remote control of a hearing aid circuit, comprising the steps of:
- providing control pulses formed by sound waves and having long and short pulse durations;
- evaluating the pulses in accordance with their pulse duration such that a respective evaluation time is allocated to pulse starts; and
- providing a chronological spacing of said evaluation times from a respective corresponding pulse start shorter than the long pulse duration and longer than a sum of the short pulse duration and a time by which the short pulse duration can be lengthened by a received reflection of the sound waves.

2. A method according to claim 1 wherein a chronological spacing that is selected longer than the duration of a chronologically following long control pulse is provided between an end of a control pulse having long duration and a start of a following control pulse.

3. A method according to claim 1 wherein the chronological spacing of the respective evaluation time from the start of a control pulse is selected at least twice as long as the duration of a chronologically following short control pulse.

4. A method according to claim 1 wherein a chronological spacing that is selected at least twice as long as the duration of a chronological long control pulse is provided between starts of two control pulses.

5. A method according to claim 1 wherein the duration of the chronological long remote control pulses is selected at least twice as long as the duration of the chronological short control pulses.

6. A method according to claim 1 wherein a plurality of control pulses are combined in groups and, within the group, have identical chronological spacings from a start of neighboring control pulses.

7. A method according to claim 1 wherein the control pulses have sound waves in an ultrasound range as a carrier frequency.

8. A method for remote control of a hearing-aid circuit, comprising the steps of:
- providing control pulses formed by sound waves which are not reflected and which have long and short pulse durations, and wherein reflections of the sound waves can also be present whose pulses are mixed in with pulses of the unreflected sound waves;
- evaluating the pulses according to their durations;
- blanking pulses of the reflected sound waves appearing after an end of a short pulse duration control pulse with blanking pulses that have a blanking time of variable duration; and
- automatically adapting the blanking time to a duration of a pause which remains between an end of a control pulse which is lengthened by reflection and a start of a following control pulse.

9. A method according to claim 8 wherein the blanking time having variable duration is automatically additionally adapted to a duration of a pause that remains between an end of a last control pulse in a group of control pulses and a start of a first control pulse of a following group of control pulses.

10. A method according to claim 8 wherein a chronological spacing that is selected longer than the duration of a chronological long control pulse is provided between an end of a control pulse having long duration and a start of a following control pulse.

11. A method according to claim 8 wherein the chronological spacing of the respective evaluation time from the start of a control pulse is selected at least twice as long as the duration of a chronological short pulse.

12. A method according to claim 8 wherein a chronological spacing that is selected at least twice as long as the duration of a chronological long control pulse is provided between starts of two remote control pulses.

13. A method according to claim 8 wherein the duration of the chronological long control pulses is selected at least twice as long as the duration of the chronological short control pulses.

14. A method according to claim 8 wherein a plurality of remote control pulses are combined in groups and, within the group, have identical chronological spacings from the start of neighboring control pulses.

15. A method according to claim 8 wherein the remote control pulses have sound waves in an ultrasound range as a carrier frequency.

16. A system for remote control of a hearing-aid circuit, comprising:

- transmitter means for providing control pulses formed by sound waves and having long and short pulse durations;
- a hearing aid having means for receiving the control pulses;
- said hearing aid having means for evaluating the control pulses in accordance with their pulse duration such that a respective evaluation time is allocated to pulse starts; and
- said hearing means having means for providing a chronological spacing of said evaluation times from their respective corresponding pulse start shorter than the long pulse duration and longer than a sum of the short pulse duration and a time by which the short pulse duration can be lengthened by a received reflection of the sound waves.

17. A remote control means according to claim 16 wherein said hearing aid has a pulse shaping circuit, a pulse counter, a monoflop, and a controller, the pulse shaping circuit having its output side connected to the pulse counter and to the monoflop, said monoflop having a hold time approximately corresponding to an oscillatory duration of a carrier-frequency sound wave of the control pulses and whose output signal respectively signals a beginning and end of the control pulses through to the controller which in turn controls the pulse counter.

18. A remote control means according to claim 17 wherein said hearing aid has a circuit means connected to the controller for generating a blanking signal having a variable blanking duration.

19. A remote control means according to claim 18 wherein the circuit means for generating a blanking signal is designed as a monoflop whose hold time is adapted to chronological spacing between starts of neighboring remote control pulses such that the start of the remote control pulses starts the monoflop whose output signal is enabled as a blanking signal in the controller after arrival of an end of a remote control pulse lengthened by reflections.

20. A system for remote control of a hearing aid circuit, comprising:

- transmitter means for providing control pulses formed by sound waves which are not reflected and which have long and short pulse durations, and wherein reflections of the sound waves can also be present whose pulses are mixed in with the pulses of the unreflected sound waves;
- a hearing aid having means for receiving the control pulses;
- said hearing aid having means for evaluation the control pulses according to their duration;
- said hearing aid having means for blanking pulses of the reflected sound waves appearing after an end of a short pulse duration pulse with blanking pulses that have a blanking time of variable duration; and
- said hearing aid having means for automatically adapting the blanking time to a duration of a pause which remains between an end of a control pulse which is lengthened by reflection and a start of a following control pulse.

21. A remote control means according to claim 20 wherein said hearing aid has a pulse shaping circuit, a pulse counter, a monoflop, and a controller, the pulse shaping circuit having its output side connected to the pulse counter and to the monoflop, said monoflop having a hold time approximately corresponding to an oscillatory duration of a carrier-frequency sound wave of the control pulses and whose output signal respectively signals a beginning and end of the control pulses through to the controller which in turn controls the pulse counter.

22. A remote control means according to claim 21 wherein said hearing aid has a circuit means connected to the controller for generating a blanking signal having a variable blanking duration.

23. A remote control means according to claim 22 whereby the circuit means for generating a blanking signal is designed as a monoflop whose hold time is adapted to chronological spacing between starts of neighboring remote control pulses such that the start of the remote control pulses starts the monoflop whose output signal is enabled as a blanking signal in the controller after arrival of an end of a remote control pulse lengthened by reflections.

* * * * *